United States Patent
Habets et al.

(10) Patent No.: US 9,508,188 B2
(45) Date of Patent: Nov. 29, 2016

(54) RE-CENTERING A VIEW OF A SCENE OF A THREE-DIMENSIONAL IMAGE OF ANATOMY OF INTEREST AND AN ALIGNMENT OBJECT BASED ON A NEW LOCATION OF THE ALIGNMENT OBJECT IN THE THREE-DIMENSIONAL IMAGE

(75) Inventors: Raymond Joseph Elisabeth Habets, Eindhoven (NL); Javier Olivan Bescos, Eindhoven (NL); Joost Peters, Eindhoven (NL); Jeroen Jozef Sonnemans, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1174 days.

(21) Appl. No.: 13/257,682

(22) PCT Filed: Mar. 19, 2010

(86) PCT No.: PCT/IB2010/051197
§ 371 (c)(1),
(2), (4) Date: Sep. 20, 2011

(87) PCT Pub. No.: WO2010/106525
PCT Pub. Date: Sep. 23, 2010

(65) Prior Publication Data
US 2012/0011457 A1 Jan. 12, 2012

(30) Foreign Application Priority Data
Mar. 20, 2009 (EP) .................................... 09155731

(51) Int. Cl.
*G06F 3/048* (2013.01)
*G06T 15/20* (2011.01)
*G06T 19/00* (2011.01)

(52) U.S. Cl.
CPC ............. *G06T 15/20* (2013.01); *G06T 19/003* (2013.01); *G06T 2210/41* (2013.01)

(58) Field of Classification Search
None
See application file for complete search history.

(56) References Cited

U.S. PATENT DOCUMENTS

| 4,543,572 A * | 9/1985 | Tanaka | ................... G01C 21/22 340/995.18 |
| 6,331,116 B1 * | 12/2001 | Kaufman | ............... G06K 9/209 345/418 |
| 6,694,163 B1 * | 2/2004 | Vining | ................... G06T 17/00 128/920 |

(Continued)

FOREIGN PATENT DOCUMENTS

| WO | 2007026112 A2 | 3/2007 |
| WO | 2008149274 A1 | 12/2008 |

OTHER PUBLICATIONS

By Delphine Nain, et al.; Entitled: "An Interactive Virtual Endoscopy Tool"; Artificial Intelligence Laboratory, Massachusetts Institute of Technology, Cambridge, MA, USA and Brigham and Women's Hospital, Harvard Medical, Boston, MA, USA; XP-002434725; pp. 1-6.

(Continued)

*Primary Examiner* — Barry Drennan
*Assistant Examiner* — Jason Pringle-Parker (57) ABSTRACT

View parameter establishing means are arranged for establishing a first view parameter value based on a first object parameter value. View visualization means are arranged for visualizing the view of the image in accordance with the first view parameter value. Interaction means are arranged for enabling a user to indicate a point in the view. Object parameter updating means are arranged for updating the object parameter based on the point to obtain a second object parameter value. The view parameter establishing means is arranged for updating the view parameter based on the second object parameter value to obtain a second view parameter value. The view visualization means is arranged for sequentially visualizing a view of the image in accordance with an intermediate view parameter value between the first view and the second view parameter values, and a view of the image in accordance with the second view parameter value.

20 Claims, 3 Drawing Sheets

(56) References Cited

U.S. PATENT DOCUMENTS

| | | | | |
|---|---|---|---|---|
| 7,461,345 | B2* | 12/2008 | Lettau | G01C 21/367 701/532 |
| 7,519,469 | B2* | 4/2009 | de Silva | G01C 21/36 340/995.17 |
| 8,274,564 | B2* | 9/2012 | Girgensohn | H04N 5/247 348/143 |
| 2005/0107695 | A1* | 5/2005 | Kiraly | G06T 15/06 600/431 |
| 2005/0169507 | A1* | 8/2005 | Kreeger | G06T 7/0012 382/128 |
| 2010/0123737 | A1* | 5/2010 | Williamson | G01C 21/3647 345/672 |

OTHER PUBLICATIONS

By Jamshid Dehmeshki, et al.; Entitled: "A Smooth and Stable Fly-Through Scheme for Virtual Navigation of 3D CT Colonography" Digital Imaging Research Centre, Faculty of Computing and Information Systems and Mathematics, Kingston University, Penrhyn Road, Kingston upon Thames, Surrey, KT1 2EE, UK; Down loaded on May 19, 2010, from IEEE Xplore pp. 1-4.

By Yingcai Wu, et al.; Entitled: "Focus + Context Visualization With Animation"; Department of Computer Science and Engineering, Hong Kong University of Science and Technology; 2006, pp. 1293-1302.

* cited by examiner

RE-CENTERING A VIEW OF A SCENE OF A THREE-DIMENSIONAL IMAGE OF ANATOMY OF INTEREST AND AN ALIGNMENT OBJECT BASED ON A NEW LOCATION OF THE ALIGNMENT OBJECT IN THE THREE-DIMENSIONAL IMAGE

FIELD OF THE INVENTION

The invention relates to visualizing a view of a scene comprising a three-dimensional image and an object, the view having a view parameter associated therewith, the object having an object parameter associated therewith. The invention also relates to medical image analysis, more particularly vessel analysis.

BACKGROUND OF THE INVENTION

Tools for three-dimensional visualization of three-dimensional (3D) datasets are known. In the medical field, such tools are used to support vessel analysis. These tools may offer functionality for advanced viewing, segmentation, inspection and quantification of vessels. The vessel analysis provided by such tools may support inspection of vessels by means of vessel segmentation. Some vessel analysis tools automatically track parts of a vessel structure.

WO 2008/149274 discloses a method of inspecting tubularly shaped structures (1') within a three-dimensional (3D) image data set, e.g. a vessel in a medical image. Initially, there is provided an image data set and there is performed a visualization of the image data set. Then, an inspection of the image data set is performed. During the inspection the user moves a pointer (P), e.g. via a computer mouse, and a processor performs a local segmentation around the pointer so as to determine a possible shape of a tubularly shaped segmented object (1'), e.g. a vessel, and the processor also makes a local analysis of the segmented object. Thereafter, a screen displays a view (P1) of the segmented object (1'), where the orientation of the first view is derived from the local analysis; the first view can for example be a cross-sectional or longitudinal view.

The placement of an object over a particular vessel, for example a ring which is placed around the vessel, may be used in such a method for displaying one or more views aligned with the vessel, for example a cross sectional view of the vessel or a longitudinal sectional view of the vessel, with the vessel and object centered in the view. If the object is moved with respect to the volume, the sectional views are automatically updated to re-center around the new position of the object. However, the manipulation of such a view with an object may be difficult.

SUMMARY OF THE INVENTION

It would be advantageous to have an improved system for visualizing a view of a scene comprising a three-dimensional image and an object. To better address this concern, in a first aspect of the invention a system is presented in which the view has a view parameter associated therewith, and in which the object has an object parameter associated therewith. The system may comprise view parameter establishing means for establishing a first view parameter value based on a first object parameter value;

view visualization means for visualizing the view of the image in accordance with the first view parameter value;

interaction means for enabling a user to indicate a point in the view; and object parameter updating means for updating the object parameter based on the point to obtain a second object parameter value;

the view parameter establishing means being arranged for updating the view parameter based on the second object parameter value to obtain a second view parameter value;

the view visualization means being arranged for sequentially visualizing at least one view of the image in accordance with an intermediate view parameter value between the first view parameter value and the second view parameter value, and a view of the image in accordance with the second view parameter value.

The first view in accordance with the first view parameter value corresponds to the first object parameter value, whereas the second view in accordance with the second view parameter value corresponds to the second object parameter value. Jumping from the first view directly to the second view may be confusing for a user. It may be difficult to understand immediately the relationship between the two views, because the two views have been created using a different view parameter value. The sequential visualization of the intermediate view may provide for a smoother transition from the first view to the second view. It may allow the user to better understand the interaction between the object parameter and the view parameter. Consequently, the user can more efficiently manipulate the view parameter value. This can be used for efficiently creating a desirable view of the image.

The view visualization means may be arranged for sequentially visualizing views in accordance with a plurality of sequential intermediate view parameter values. This makes the transition smoother. When a sufficiently large number of views are visualized sequentially, an animation from the first view to the second view may be realized.

The object parameter may comprise a position of the object and/or an orientation of the object. The position of the object may, for example, indicate the desired center of the view, and the orientation of the object may indicate a desired viewing direction of the view. The position and/or orientation of the object may be aligned with a vessel, either manually or automatically, based on the point input. The indication of the point in the view may be realized by moving the object, for example using cursor keys.

The view parameter may comprise a geometric parameter of the view. Such a geometric parameter may include a viewing direction, a zoom factor, a camera position. The geometric parameter may include a position and/or orientation of a plane used in a multi-planar reformat. A geometric view parameter may be used to define a portion of the image which is visualized in the view.

The interaction means may be arranged for enabling a user to indicate the point by means of a mouse pointer. A mouse pointer is a convenient way to indicate a point. For example, the point may be used to re-position the object at the point. For example, the object may be aligned with a vessel visible at the point.

The interaction means may be arranged for enabling the user to indicate a sequence of points, the visualization means being arranged for performing the sequential visualization upon depressing or releasing a button. When a sequence of points is traversed, it may be more intuitive to keep the view parameter value fixed until the end of the sequence is reached.

The interaction means may be arranged for enabling a user to indicate the sequence of points by dragging the object, the visualization means being arranged for visualizing the object in accordance with a sequence of object parameters corresponding to the sequence of points, the object being visualized using the first view parameter value. By keeping the view parameter value fixed during the drag operation, the object may be updated intuitively and visualized in the original view. Only when the drag operation is completed, the view is re-centered via the sequence of views. If the view parameter were updated during the drag operation, it would be difficult for the user to keep track of the image and the object.

The visualization means may be arranged for updating the view parameter to avoid the object being moved beyond a border of the view. Should the object, due to changes in the object parameter, move beyond the border of the view, out of sight, it is useful to update the view parameter such that the object becomes visible again in the view.

The image may comprise a volumetric image and the view may comprise a multi-planar reformat of the volumetric image. Such a multi-planar reformat may be useful in many clinical applications. However, as navigating the image by means of such reformats may be relatively difficult, it may be especially useful to apply the techniques described herein to a view comprising a multi-planar reformat.

The volumetric image may represent a vascular structure, and the object parameter establishing means may be arranged for establishing an object parameter value corresponding to a position on and/or orientation of a vessel portion of the vascular structure indicated by the point. The techniques described herein may be advantageously applied to interactive analysis of a vascular structure, because such analysis involves many different viewing orientations corresponding to the local vessel orientations.

The view parameter establishing means may be arranged for establishing a view parameter value corresponding to a predetermined position or a predetermined orientation of the object in the view. Such re-positioning, e.g. re-centering, can be a cause for loosing track of which portion of the image is being visualized. Consequently, the intermediate views are particularly suitable to be applied to such a view parameter.

The visualization means may be arranged for establishing the first and second view parameter such that the object appears in the view at a predetermined position and/or orientation with respect to the view.

A method of visualizing a view of a scene comprising a three-dimensional image and an object is presented, the object having an object parameter associated therewith, the view having a view parameter associated therewith. The method may comprise:
  establishing a first view parameter value based on a first object parameter value;
  visualizing the view of the image in accordance with the first view parameter value;
  enabling a user to indicate a point in the view;
  updating the object parameter based on the point to obtain a second object parameter value;
  updating the view parameter based on the second object parameter value to obtain a second view parameter value; and
  sequentially visualizing at least one view of the image in accordance with an intermediate view parameter value between the first view parameter value and the second view parameter value, and a view of the image in accordance with the second view parameter value.

A computer program product may comprise instructions for causing a processor system to perform the method set forth.

BRIEF DESCRIPTION OF THE DRAWINGS

These and other aspects of the invention will be further elucidated and described with reference to the drawing, in which.

DETAILED DESCRIPTION OF EMBODIMENTS

In the following, several embodiments will be described in detail. These embodiments are examples only. The skilled person will appreciate that variations of the described embodiments are possible within the scope of the claims.

Figure 1:
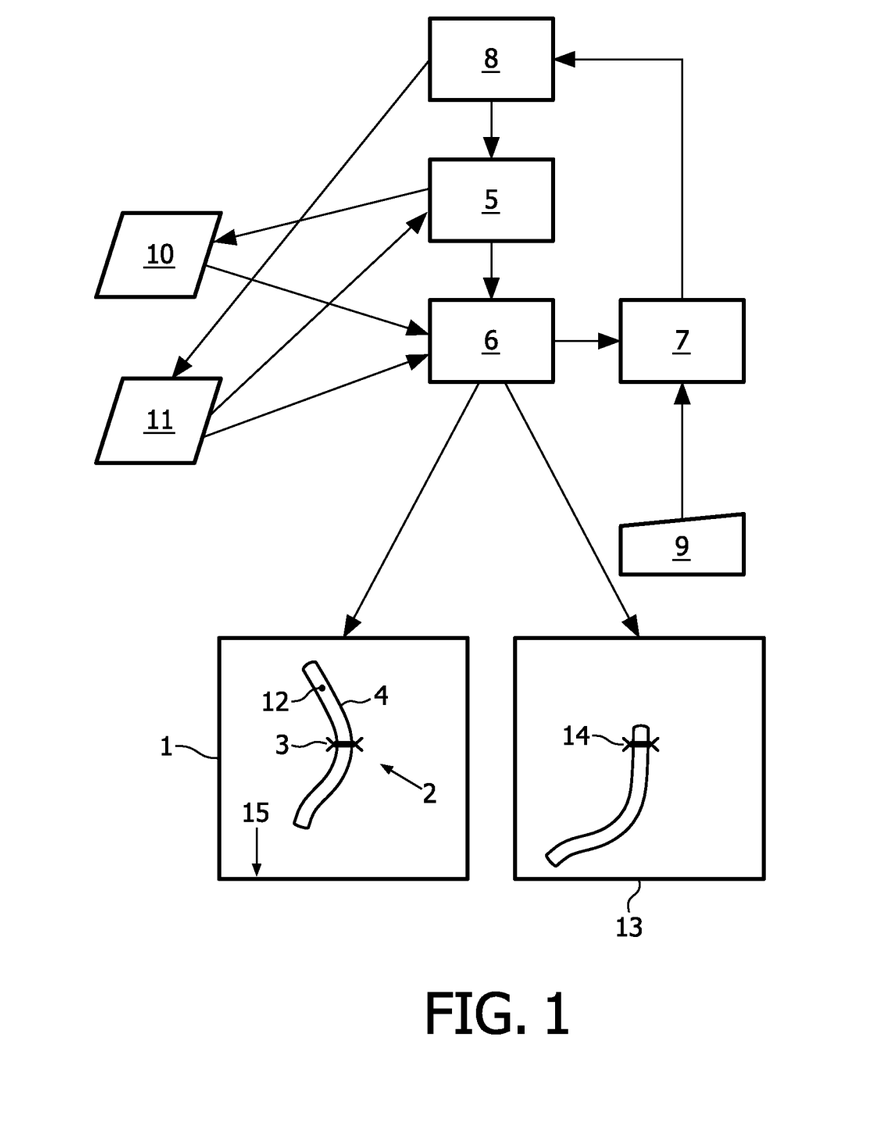
FIG. 1 is a block diagram of a system for visualizing a view of a scene.

A system for visualizing a view 1 of a scene 2 is presented. The scene 2 may comprise a three-dimensional image and an object 3. The view 1 may comprise a portion of the image, for example a vessel portion 4 represented by the image. The view has a view parameter 10 associated therewith, whereas the object 3 has an object parameter 11 associated therewith.

The system may comprise view parameter establishing means 5 for establishing a first view parameter value based on a first object parameter value. The system may further comprise view visualization means 6 for visualizing the view 1 of the image in accordance with the first view parameter value. The system may further comprise interaction means 7 for enabling a user to indicate a point 12 in the view, for example by means of a trackball, mouse pointer, cursor keys, or touch screen. Preferably, the point is a point within a viewport in which the view is displayed.

The system may further comprise object parameter updating means 8 for updating the object parameter 11 based on the point 12 to obtain a second object parameter value. This second object parameter value can be used to replace the first object parameter value. In this respect, the view parameter establishing means 5 may comprise means for updating the view parameter 10 based on the second object parameter value to obtain a second view parameter value. Moreover, the view visualization means 6 may comprise means for visualizing a view 13 of the image in accordance with the second view parameter value. The view visualization means 6 may further comprise means for sequentially visualizing at least one view of the image in accordance with an intermediate view parameter value between the first view parameter value and the second view parameter value. This latter at least one view of the image may be visualized before visualizing the view of the image in accordance with the second view parameter value.

The view visualization means 6 may be arranged for sequentially visualizing a sequence of views corresponding to a sequence of intermediate view parameter values.

The view or views corresponding to the intermediate view parameter value or values is referred to hereinafter as intermediate view or views. This intermediate view or these intermediate views may be generated, for example, using a key frame interpolation algorithm. The interpolation algorithm may be provided with first and second locations and/or orientations of the object corresponding to the first object parameter value and the second parameter value, respectively. Also, an animation speed or total animation time may be provided, to prescribe the amount of time during which the intermediate views are displayed. Hermite interpolation may be used by employing a formula s=H(t), to compute the intermediate location(s) and/or orientation(s) of the object; from these, the intermediate view parameter value(s) may be derived. Hermite interpolation is known per se in the art. The two quantities, location and orientation, may be interpolated independently and combined afterwards. In the case of a plurality of intermediate views, in a preferred embodiment, the first intermediate views only change the location, and after that the orientation starts to change. This improves the perceived smoothness of the animation. Instead of, or in addition to, Hermite interpolation, it is possible to use the intermediate positions of the object obtained during a drag operation, to obtain the intermediate view parameters. Alternatively, the vessel may be tracked along a centerline of the vessel towards the new position of the object.

The object parameter 11 may define a position of the object and/or an orientation of the object. Consequently, the object parameter updating means 8 may be arranged for establishing a new position and/or orientation of the object based on the point 12. The view parameter 10 may comprise a geometric parameter of the view 1. Such a geometric parameter can define a multi-planar reformat of the image, or a frustum, or a viewing direction, or a camera position, for example.

Figure 3:
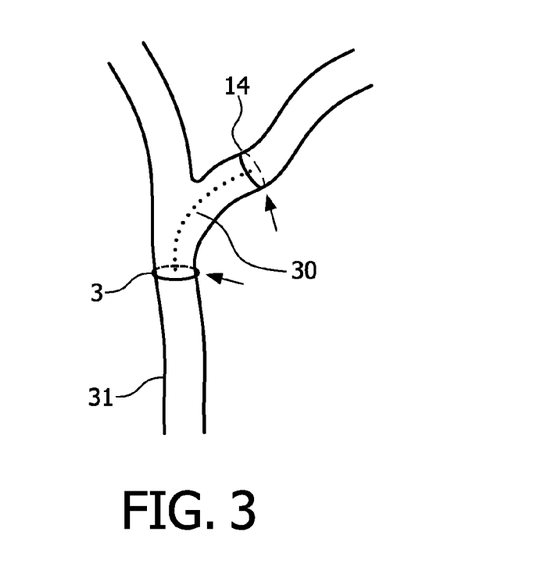
FIG. 3 illustrates a vessel portion and two positions of a ring.

FIG. 3 illustrates a portion of a vessel structure 31 represented by a three-dimensional image, a sequence of points 30, as well as an object 3 in accordance with a first object parameter value, and the object 14 in accordance with a second object parameter value. The interaction means 7 may be arranged for enabling the user to indicate such a sequence of points 30, for example by dragging the object 4 around. Such dragging may be controlled using a mouse device or trackball or touch screen, for example. Alternatively, it is possible to move the object 4 around in steps using cursor keys or a joystick, for example. The visualization means 6 may be arranged for performing the sequential visualization upon depressing or releasing a button, e.g. a mouse button. More generally, the sequential visualization may start when an indication is received that the sequence of points has ended. For example, after a time delay during which no new point has been indicated. Until the sequential visualization is activated by said indication, the view parameter 10 is not updated. However, the object parameter 11 may be updated after every point in the sequence of points 30.

The interaction means 7 may comprise means for enabling a user to indicate the sequence of points 30 by dragging the object 3. Moreover, the visualization means 6 may comprise means for visualizing the object 3 in accordance with a sequence of object parameters corresponding to the sequence of points, the object being visualized using the first view parameter value. In other words, the object 3 is visualized sequentially in accordance with a sequence of points 30, while the view parameter 10 is not changed. However, the view may be defined by more than just the view parameter 10. Other view parameters may be updated to account for the changed object parameter 11. For example, a depth of a multi-planar reformat may be updated to account for the changed object parameter 11, whereas the panning of the multi-planar reformat may be defined by the view parameter 10, and kept constant until the end of the sequence has been reached.

The visualization means 7 may be arranged for updating the view parameter 10 to avoid the object 3 being moved beyond a border 15 of the view 1. Consequently, the object remains visible inside the view. The view parameter 10 may be updated such that the object 3 is kept near the border 15 of the view 1, or alternatively the view parameter 10 may be updated such that the object 3 returns to a predetermined position (e.g. the center) in the view.

As mentioned before, the volumetric image may represent a vascular structure. The object parameter establishing means 8 may comprise means for establishing an object parameter value corresponding to a position on and/or orientation of a vessel portion of the vascular structure indicated by the point. Such means are known from WO 2008/149274.

The view parameter establishing means 5 may comprise means for establishing a view parameter value corresponding to a predetermined position or a predetermined orientation of the object in the view. For example, the object may be centered in the view. The orientation may be frontal or from the side. For example, it is possible to visualize three views of the scene 2, as seen from three orthogonal directions. When a point or a sequence of points is indicated in one of the views, the intermediate view or views are visualized in that one of the views. The other views may either be updated instantaneously, or may also show intermediate view or views.

Figure 2:
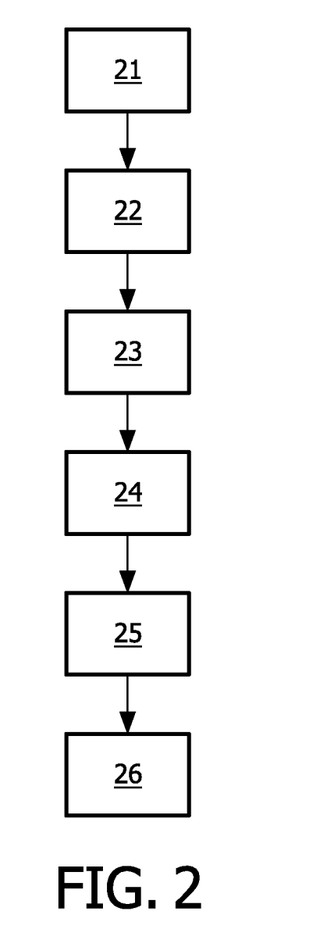
FIG. 2 is a block diagram of a method of visualizing a view of a scene.

FIG. 2 illustrates a method of visualizing a view 1 of a scene 2 comprising a three-dimensional image and an object 3, the object 3 having an object parameter associated therewith, the view 2 having a view parameter associated therewith. In step 21, a first view parameter value is established based on a first object parameter value. In step 22, the view of the image is visualized in accordance with the first view parameter value. In step 23, a user is enabled to indicate a point in the view. In step 24, the object parameter is updated based on the point to obtain a second object parameter value. In step 25, the view parameter is updated based on the second object parameter value to obtain a second view parameter value. In step 26, at least one view of the image is visualized in accordance with an intermediate view parameter value between the first view parameter value and the second view parameter value. After that, a view of the image is visualized in accordance with the second view parameter value. The method may be implemented as a computer program.

Figure 4:
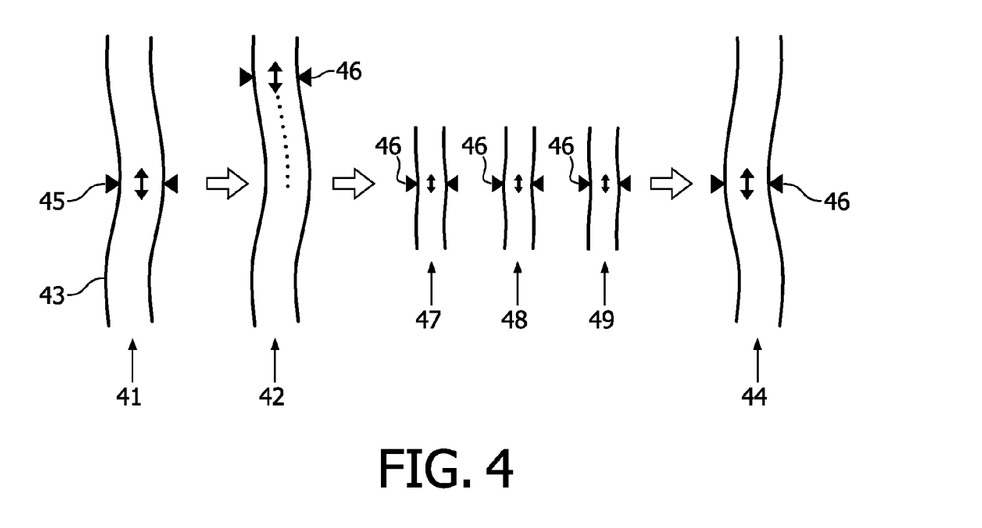
FIG. 4 illustrates a sketch of a sequence of views after a drag operation.

FIG. 4 illustrates an example usage of the system of FIG. 1 and the method of FIG. 2. FIG. 4 diagrammatically shows views 41, 42, 47, 48, 49, and 44. View 41 comprises a vessel segment 43 with an object 45. The object 45 in this case comprises two arrow shapes on the left and on the right of the vessel segment 43, respectively. The user, via his input device such as a mouse, drags the object 45 to a higher position 46. This is indicated in view 42. In view 42, the vessel 43 is displayed in the same way as in view 41. When the user stops the drag operation (for example, by releasing a mouse button), an animation is displayed. This animation comprises the sequential views 47, 48, and 49. The view is gradually changed such that the object 45 is again centered in the view, and the vessel segment displayed gradually becomes the vessel segment around the new position 46 of the object 45. Finally, the view 44 is displayed. In this view, the object 45 is centered in the view, and the vessel segment around the object 45 is shown.

The view parameter 10 and/or object parameter 11 are not limited to geometric parameters. The parameters could also be used to define a color map, for example.

In vascular applications, vessels may be visualized for example using MIPs, surface renderings, volume renderings, curved planar reformats or straightened reformat views. Moreover, local vessel properties, such as area and radius, may be measured at several locations in the image data to quantify for example the degree of stenosis or the size of an aneurysm. For the curved planar or straightened reformat visualization techniques a path through the vessel center may be used.

Local vessel inspection may be facilitated by using an object, for example a ring, in the image. Although in the following, a ring is used as an example of an object, it will be understood that any other kind of object (e.g. a square, a plane, a dot) could be used to replace the ring.

The ring can be used to align one or more views of an image representing a structure of interest, such that the ring appears at a predefined position and orientation in the view. In evaluation it was found that users would like to 'interact' with such a ring, for example to move the ring with respect to the image, which would cause a re-alignment of the view to bring the ring back to the predefined position and orientation. However, if the view is updated while the ring is being interacted with, the ring would remain in a fixed position and orientation in the view; only the visualized portion of the image would change. This was not considered intuitive.

During the interaction with the ring, local vessel analysis alignment tools may be active and update any views as expected (maintaining the vessel alignment). Also the view on which the interaction takes place may follow the depth of the selected vessel during the interaction. The ring can also be dragged from one vessel into another, so it is not necessary to always follow a single vessel. A variant on this approach may keep the ring aligned with the same vessel always, restricting the flexibility a bit but making it easier to follow the vessel.

After interaction with the ring, the view may be re-centered and/or re-orientated with the ring. For example, a multi-planar reformat view may be kept parallel to the vessel direction and centered on the ring. When the ring is moved by a user, this automatic realignment may lead to a confusing user interaction. Keeping the view centered around the ring would lead to a confusing user experience, as the ring which is being dragged does not appear to move in the view, and instead the whole view moves. A solution is to not completely re-align the view around the ring during drag of the ring—but only when the drag operation is completed. Still, this may in some cases confuse the user because of the instantaneous re-centering of the view (which might cause the user to lose the overview).

A smooth re-centering may be applied. Such re-centering may use a key frame interpolation technique to animate the view from the view position at mouse release to a view position where the ring is centered. Instead of a 'jumping view' the user clearly sees what is going on.

Such animated transitions may be triggered, for example, by any of the following events:

A click in a view to define a new object position. In such a case, the animation may be triggered by mouse click.

A drag in a view to drag the object to a new position. In such a case, the animation may be triggered by mouse release.

A rotation of the object, e.g. by dragging a corner of the object. In such a case, the animation may be triggered by mouse release.

A drag of the object beyond the border of the view. In such as case, the animation may be triggered by the fact that the object is dragged beyond the border of the view.

Apart from re-centering, the view may also be reoriented parallel to the vessel at that position. Interactive reorientation or rotation of the ring may be allowed for correcting mistakes in the auto-alignment of the ring. When the ring orientation is altered by (mouse) interaction, the view may be animated to align with the new orientation.

If the user has found a position (using the ring) and wants to do a measurement, the user can perform a measurement of the vessel at the ring position. For example, the lumen, dilatation or length of a portion of a vessel may be measured at the position of the ring. In the case of a dual ring measurement (such as a length measurement of a vessel portion from a first ring to a second ring), a next click may position the second ring, so that the measurement may be completed. Rings belonging to a measurement can be edited similarly to the editing of the live inspection ring. The new ring-based measurements all may have clearly visible and editable 3D labels to support easy generation of secondary capture images for use in a report.

It will be appreciated that the invention also extends to computer programs, particularly computer programs on or in a carrier, adapted for putting the invention into practice. The program may be in the form of a source code, an object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or stored in one or more files that may be linked statically or dynamically. Another embodiment relating to a computer program product comprises computer executable instructions corresponding to each of the means of at least one of the systems and/or products set forth. These instructions may be subdivided into subroutines and/or stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means. When the program is embodied in such a signal, the carrier may be constituted by such a cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for visualizing a single view of a scene comprising a three-dimensional image of anatomy of interest and an object placed around a perimeter of the anatomy of interest at a first point of the anatomy of interest, the single view having a view parameter associated therewith, the anatomy of interest being a tubular structure, the object having an object parameter associated therewith, and the object being graphical alignment indicia that is not part of any anatomy, comprising view parameter establishing means for establishing a first view parameter value based on a first object parameter value, wherein the first object parameter value provides a first spatial position of the object in the three-dimensional image;

view visualization means for constructing and visualizing the single view of the scene of the image in accordance with the first view parameter value by centering the single view of the scene on the first object parameter value, wherein the single view of the scene shows the tubular structure along a long axis of the tubular structure with the object around the first point, wherein the long axis is transverse to a diameter of the tubular structure;

interaction means for enabling a user to indicate a second point in the single view by moving the object in the single view with a mouse from the first point in the single view to the second point in the single view; and object parameter updating means for updating the object parameter based on the second point to obtain a second object parameter value wherein the second object parameter value provides a second different spatial position for the object in the three-dimensional image;

wherein the view parameter establishing means being arranged for updating the view parameter based on the second object parameter value to obtain a second view parameter value; and wherein the view visualization means being arranged for sequentially constructing and visualizing at least one intermediate view of the image in accordance with an intermediate view parameter value between the first view parameter value and the second view parameter value, and constructing and visualizing a second single view of the image in accordance with the second view parameter value by centering the single view on the second object parameter value and reorienting the second single view parallel to the tubular structure at that position.

2. The system according to claim 1, the view visualization means being arranged for sequentially visualizing single views in accordance with a plurality of sequential intermediate view parameter values.

3. The system according to claim 1, the object parameter comprising an orientation of the object.

4. The system according to claim 1, the view parameter comprising a geometric parameter of the view.

5. The system according to claim 1, the interaction means being arranged for enabling a user to indicate the point by means of a mouse pointer.

6. The system according to claim 1, the interaction means being arranged for enabling the user to indicate a sequence of points, the visualization means being arranged for performing the sequential visualization when an indication is received that the sequence of points has ended.

7. The system according to claim 6, the interaction means being arranged for enabling a user to indicate the sequence of points by dragging the object, the visualization means being arranged for visualizing the object in accordance with a sequence of object parameters corresponding to the sequence of points, the object being visualized using the first view parameter value.

8. The system according to claim 6, wherein the visualization means is arranged for updating the view parameter to avoid the object being moved beyond a border of the second view.

9. The system according to claim 1, the view comprising a multi-planar reformat of the volumetric image.

10. The system according to claim 9, the volumetric image representing a vascular structure, and the object parameter establishing means being arranged for establishing an object parameter value corresponding to a position on and/or orientation of a vessel portion of the vascular structure indicated by the point.

11. The system according to claim 9, the view parameter establishing means being arranged for establishing a view parameter value corresponding to a predetermined position or a predetermined orientation of the object in the view.

12. A method of visualizing a single view of a scene comprising a three-dimensional image of anatomy and an object identifying a location of interest in the anatomy, the object having an object parameter associated therewith, the view having a view parameter associated therewith, comprising placing the object around anatomy at the location of interest in the three-dimensional image, wherein the first object parameter value provides a first spatial position of the location of interest, and the object is graphical alignment indicia that is not part of any anatomy;

establishing a first view parameter value based on a first object parameter value, constructing and visualizing the single view of the image in accordance with the first view parameter value by centering the single view of the scene on the first object parameter value, wherein the single view visually presents both a long axis of the anatomy and the object at the location of interest of the anatomy, wherein the long axis is transverse to a diameter of the anatomy;

enabling a user to indicate a point in the single view, wherein the point corresponds to a location different than the location of interest;

updating the object parameter based on the point to obtain a second object parameter value, wherein the second object parameter value provides a second different spatial position for the object in the three-dimensional image;

updating the view parameter based on the second object parameter value to obtain a second view parameter value; and sequentially constructing and visualizing at least one view of the image in accordance with an intermediate view parameter value between the first view parameter value and the second view parameter value, and sequentially constructing and visualizing a second single view of the image in accordance with the second view parameter value by re-aligning the single view of the scene to center the view of the scene on the second object parameter value and reorienting the single view parallel to the anatomy at that position.

13. The method of claim 12, wherein the anatomy includes at least two vessels, and further comprising:

dragging the graphical alignment indicia from a first vessel of the anatomy to a second different vessel of the anatomy; and placing the graphical alignment indicia around the second different vessel.

14. A non-transitory computer program product comprising instructions, which when executed by a computer processor cause the computer processor to:

receive a three-dimensional image of a vessel acquired and generated by an imaging system;

place an alignment object around an outside of the vessel in the three-dimensional image, wherein the alignment object is graphical alignment indicia;

determine a first object parameter value, wherein the first object parameter value provides a first spatial position of the alignment object in the three-dimensional image generate a first view parameter value based on a first object parameter value;

construct and visualize a single first view in accordance with the first view parameter value, centering the alignment object and the vessel on the first object parameter value, wherein the single first view shows both the vessel along a long axis of the vessel and the alignment object at the first spatial position, wherein the long axis is transverse to a diameter of the vessel;

receive an input indicative of a second different spatial position for the alignment object around a second different location outside of the vessel in the three-dimensional image;

transform the object parameter based on the input to obtain a second object parameter value wherein the second object parameter value provides a second different spatial position of the alignment object in the three-dimensional image;

transform the view parameter based on the second object parameter value to obtain a second view parameter value;

construct and visualize a single second view in accordance with the second view parameter value, centering the alignment object and the vessel on the second object parameter value; and reorients the single second view parallel to the vessel at the second different location.

15. The non-transitory computer program product of claim 14, wherein the alignment object is one of a ring, a square, or a plane the surrounds the vessel.

16. The non-transitory computer program product of claim 14, wherein the processor re-orients the view through a smooth re-centering that uses an interpolation algorithm to animate the view.

17. The non-transitory computer program product of claim 14, wherein the sub-portion and the second sub-portion are segments of a vessel of interest.

18. The non-transitory computer program product of claim 14, wherein at least one of the object parameter or the second object parameter defines a color map.

19. The non-transitory computer program product of claim 14, wherein at least one of the view parameter or the second view parameter defines a color map.

20. The non-transitory computer program product of claim 14, wherein the processor gradually re-centers the view at the second object parameter value to construct the single second view of the image using animation.

* * * * *